United States Patent
Grünenfelder et al.

[11] Patent Number: 5,991,274
[45] Date of Patent: Nov. 23, 1999

[54] METHOD FOR TESTING THE CONFORMITY OF AN ALGORITHM CALLED GCRA FOR DISCRIMINATING DATA CELLS, AND AN APPARATUS FOR EXECUTING THE METHOD

[75] Inventors: Reto Grünenfelder, Dietlikon; Thomas Stock, Zürich, both of Switzerland

[73] Assignee: Alcatel STR AG, Zurich, Switzerland

[21] Appl. No.: 08/689,817

[22] Filed: Aug. 15, 1996

[30] Foreign Application Priority Data

Aug. 18, 1995 [CH] Switzerland ............. 02-366/95

[51] Int. Cl.[6] .................. H04J 3/14; H04L 12/26
[52] U.S. Cl. ........................ 370/253; 370/395
[58] Field of Search .................. 370/229, 230, 370/231, 232, 233, 234, 235, 250, 252, 253, 395, 397, 398, 399, 418

[56] References Cited

U.S. PATENT DOCUMENTS

| | | | |
|---|---|---|---|
| 5,524,006 | 6/1996 | Hluchyj et al. | 370/233 |
| 5,541,913 | 7/1996 | Witters et al. | 370/252 |
| 5,570,360 | 10/1996 | Klausmeier et al. | 370/232 |
| 5,666,353 | 9/1997 | Klausmeier et al. | 370/230 |
| 5,796,956 | 8/1998 | Jones | 395/200.63 |

*Primary Examiner*—Chau Nguyen
*Assistant Examiner*—Soon-Dong Hyun
*Attorney, Agent, or Firm*—Ware, Fressola, Van Der Sluys & Adolphson LLP

[57] ABSTRACT

A generic cell rate monitoring algorithm (GCRA) which is implemented in an ATM network element must be tested during operation. The method uses a second GCRA of the same kind which is synchronized with the first one, and a conformity test is carried out by comparing the results of both GCRAs. The synchronization is preferred when both GCRAs are in a regeneration state. This is artificially produced during operation of the GCRA to be tested by temporarily changing a parameter of the agreement in such a way, that a contract violation can no longer occur. The time of reaching the regeneration state can be limited by special steps of the method. An apparatus for carrying out the method (30) comprises a conformity decision unit (20), which counts arriving cells and compares counter positions, an implementation of the second GCRA (14) and a circuit (13) for synchronization, together with a return line (15) to an insertion circuit (16) for the cell stream in the line (1). The cell stream is directed to both GCRA implementations (4, 14) via a branch (10). The difference in running time from the branch to the two implementations cannot be longer than one cell transmission time.

11 Claims, 2 Drawing Sheets

METHOD FOR TESTING THE CONFORMITY OF AN ALGORITHM CALLED GCRA FOR DISCRIMINATING DATA CELLS, AND AN APPARATUS FOR EXECUTING THE METHOD

TECHNICAL FIELD

The invention lies in the area of data flow control at interfaces of transmission installations, particularly in networks with broad-band data transmission, and concerns a method and an apparatus for testing the conformity of a generic cell rate monitoring algorithm for discriminating data cells having untimely arrivals.

BACKGROUND OF THE INVENTION

When information of any kind is transmitted by means of digital data units in a network, the transmission media and data units are suitably defined for each other, or even standardized. An example is the ATM (Asynchronous Transfer Mode) where the ATM cell is the basic data unit. This is concretely referred to in the following for explanation purposes; the basic concepts illustrated in this manner also apply to other transmission installations.

The transmission medium (ATM) is designed so that the information from several sources is able to use the same physical transmission device simultaneously. Agreements are reached with the users about the transmission modalities in order to attain a good utilization rate or to prevent traffic jams. Parameter monitoring is required at an interface, either at a user interface or at a network interface, in order to make it possible to test the maintenance of the agreement on the side of the transmission device, and to ensure it if necessary. In the technical literature such traffic monitoring and control through the network is called "Usage/Network Parameter Control" (UPC/NPC). The parameter monitor responds to a violation of the agreement by discriminating the nonconforming data unit, usually by rejecting it or marking it for subsequent special treatment, for example subsequent elimination.

An agreement per virtual connection is negotiated during the connection phase, or it is renegotiated during a subsequent phase (so-called Connection Admission Control, CAC). At that time the parameters to be maintained are established. Probably the most important parameter is the number of data units that can be transmitted per unit of time, the so-called cell rate, respectively its complement the cell distance, which is also called intermediate arrival time. Different types of cell rates are defined: maximum, sustainable (as the upper limit for a mean) etc. The profession mostly uses the English expressions: "peak cell rate", "sustained cell rate", "mean cell rate". Other parameters are "cell delay variation" CDV, "burst tolerance" etc., where certain mutual dependencies may be present. In theory, the agreement between the network operator and the user can concern any parameters. The decisive ITU recommendations for the present status leave room for many possibilities. Only a single generic algorithm is presently defined for discriminating the data cells of a virtual connection in a cell stream, which do not correspond to the agreed parameters regarding the timely arrival of such data cells. It considers two contract parameters, the "Peak Cell Rate" or its complement the "Increment I", and the "Cell Delay Variation CDV" or the "Limit L". It is called a "Generic Cell Rate Monitoring Algorithm", GCRA, and is illustrated in two configuration forms as the "Virtual Scheduling Algorithm" and as the "Continuous-State Leaky Bucket Algorithm".

This GCRA "Generic Cell Rate Monitoring Algorithm", which is based on the increment I and the limit L, is usually used to perform a UPC/NPC in practice today. It must be able to test a cell stream for its conformity, meaning the maintenance of the contract (GCRA, I, L). The arriving traffic is considered to be GCRA, I, L-conformant (conforming to the contract), if no cells are rejected or marked during the pertinent UPC/NPC. If too many cells are lost from a connection, the question arises whether this can be attributed to a GCRA, I, L violation by the customer, to a malfunction of the implemented GCRA, or to a lack of resources in the network. In such a case it is important for legal considerations to have instruments which can clearly determine who is responsible for the deterioration of the service quality. The need exists therefore to be able to test the function of the traffic monitoring and control during operation ("in service, on-line"), namely without any special testing connection.

Such a test cannot be performed as is. The name "Continuous-State Leaky Bucket Algorithm" illustrates the problem correctly. It is derived from the analogy of the bucket which is constantly filled with liquid at alternating inflow rates, while the liquid runs out constantly according to the size of the leak as long as the bucket still contains any liquid. The GCRA has therefore the attribute of having a "memory" for events which can be considerably behind in time, until the leaky bucket is entirely empty. The arrival time of a cell which places the GCRA into this condition is called the regeneration point; in the following the condition itself is called a regeneration state. The momentary condition of the GCRA in a UPC or NPC is not tangible, and even if the regeneration points could be made determinable, a conformity test during operation could not be expected to have to wait for it, since it could be possible that none occurs before the end of the connection.

DISCLOSURE OF INVENTION

Therefore the task of the invention to present a collection of instruments whereby a "Generic Cell Rate Monitoring Algorithm" can be tested during operation in a network element at a determinable time and independently of the implementation, as to whether it makes the correct decisions in regard to whether a cell in a cell stream conforms to the agreed parameters, meaning it maintains the contract (GCRA, I, L).

According to a first aspect of the present invention, a method of testing the conformity of a generic cell rate monitoring algorithm for discriminating data cells of a virtual connection in a cell stream which do not correspond to agreed parameters on the time of arrival of such data cells, is characterized in that the cell stream is simultaneously applied to a like, second generic cell rate monitoring algorithm, that the two generic cell rate monitoring algorithms are synchronized, and that the conformity test is made by comparing the results of the two generic cell rate monitoring algorithms after the time of synchronization.

According to a second aspect of the present invention, apparatus for carrying out the first aspect of the present invention at a network element having a controller containing an implementation of a generic cell rate algorithm to be tested, comprises an insertion circuit followed by a branching element in a line for the cell stream at an input of the network element and is characterized by an implementation of a second generic cell rate algorithm and an adjacent circuit for synchronizing the generic cell rate algorithms which are connected to the branching element in such a way that the delay difference between cells traveling from the branching element to the two implementations of the generic cell rate algorithm is less than one cell transmission time, by a return line from the circuit to the insertion circuit, and by a conformity decision unit connected to the circuit, to the implementation of the second generic cell rate algorithm, and to at least one output of the network element.

The solution provides for simultaneously routing the cell stream to a second GCRA. The two algorithms are synchronized with each other. The results of both GCRAs are observed from this time on, and the conformity is affirmed or denied based on a comparison of the results.

The synchronization takes place at a time at which both GCRAs are in a state of regeneration. In a preferred configuration of the method, this condition is artificially produced by briefly changing one of the agreed parameters for the connection to be tested, without the knowledge of the user, so that a violation of the contract can no longer occur. In this way the first GCRA is forced to reach a regeneration state sooner or later, and the arrival time of each cell in the sequence is a regeneration point in this connection. By specifying the initial condition the second GCRA can be started directly from a regeneration state.

In order for a synchronization to take place in as short a time as possible, the attainment of a regeneration state is evaluated by means of an upper bound. The GCRA to be tested can be represented as a sequence $\{y\}$ of time-of-arrival differences. This sequence is not traceable without knowledge of the initial conditions. However, a majorant sequence $\{d\}$ can be formed by starting with extreme initial conditions and using the corresponding parameters. At a regeneration point of this majorant sequence $\{d\}$, the GCRA to be tested is located with certainty in the regeneration state. When this condition is reached, the changed parameter can be reset to its nominal value and the second GCRA can be simultaneously started with the nominal parameters from the regeneration state. Both GCRAs are thereby synchronized.

The majorant sequence $\{d\}$ is preferably started at the time of the parameter change, or shortly thereafter. The parameters for forming the majorant sequence $\{d\}$ must of course be suitably adapted. It is an advantage to slightly alter the changed parameter in a way so that the majorant sequence $\{d\}$ is somewhat slower to reach the regeneration point than is theoretically possible. This measure ensures that the majorant sequence $\{d\}$ really remains majorant, even if the permissible tolerances are exhausted when the algorithms are implemented.

An apparatus for executing the method is located in the vicinity of the input to the network element. The cell stream is duplicated by a branching element in the first GCRA line. The branching element is preceded by a cell insertion circuit. The cell stream is also accessible for testing purposes at least at one output of the network element. This arrangement can be a part of the network element in which the GCRA to be tested is implemented, otherwise it must be provided as an expansion of the apparatus of the invention. The latter comprises an implementation of the second GCRA, a pertinent circuit for synchronizing the GCRAs with a return line to the insertion circuit and a conformity decision unit, which processes cell streams from the cited implementation, the pertinent circuit and the at least one output. In this case the arrangement for implementing the second GCRA, including the circuit for synchronizing both GCRAs with respect to the branching element, is important. The difference in running time of the cells from the branching element to the implementation of the first GCRA to be tested, or the second GCRA, cannot be longer than the time required by a cell to pass a fixed point in the line. The circuit for synchronizing the GCRAs forms the sequence $\{d\}$ and sends special cells via the return line to the GCRA which is used to establish or reset the parameters.

In a preferred configuration, the conformity decision unit contains an evaluation circuit for F4-Flow OAM cells, which makes it possible to determine the number of cells that are lost between the insertion site of the F4 cells and the output of the network element. This addition is invalid if the cell stream is immediately tangible at the output of the implementation of the GCRA to be tested, which occurs in the fewest of cases.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
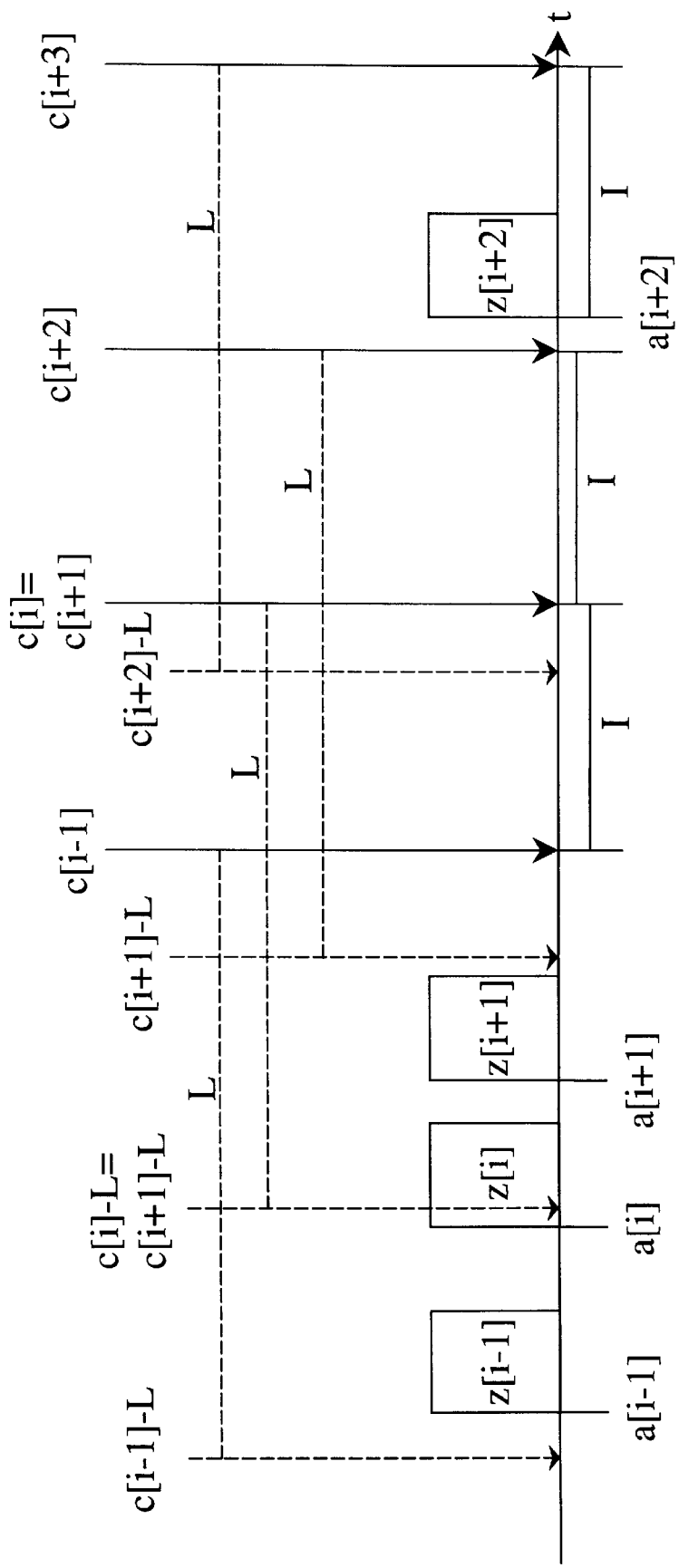
FIG. 1 illustrates the arrival of cells on the time axis and the decisive temporal relations of the algorithm.

On the time axis t FIG. 1 symbolically illustrates the cells $z[i]$ belonging to a virtual connection to be monitored, with their actual arrival times $a[i]$. The index i is only used to individualize the illustrated objects in this case, and is not a processable quantity. With the arrival of each cell from the virtual connection under consideration it is increased by 1. The "Generic Cell Rate Monitoring Algorithm", GCRA, updates an internal quantity with each arriving cell $z[i]$, the expected arrival time $c[i+1]$ of the next cell $z[i+1]$. When a cell arrives, for example cell $z[i-1]$ in FIG. 1, it determines whether its actual arrival time $a[i-1]$ is later than the expected arrival time $c[i-1]$. If this is not the case, as is drawn, it determines whether the actual arrival time $a[i-1]$ is even earlier than a permissible arrival time, which is the expected arrival time $c[i-1]$ less the limit value L, thus time $c[i-1]$-L. If this is not the case, as is drawn, the GCRA decides that it is a conforming cell and shifts the next expected arrival time $c[i]$ by the increment I. In FIG. 1, the actual arrival time $a[i]$ of the next cell $z[i]$ is earlier than the permissible arrival time $c[i]$-L. The GCRA decides that it is a nonconforming cell and does not perform an internal updating, which means that $c[i+1]$ is equal to $c[i]$. In order to be conforming, the next arriving cell $z[i+1]$ must therefore still arrive later than the permissible arrival time $c[i+1]$-L= $c[i]$-L. In FIG. 1, the actual arrival time $a[i+1]$ is after this limit, but before the expected arrival time $c[i+1]=c[i]$. The GCRA therefore again shifts the next expected arrival time $c[i+2]$ by the increment I. In the illustrated example, the next cell $z[i+2]$ with the actual arrival time $a[i+2]$ only arrives after the expected arrival time $c[i+2]$. The GCRA shifts the next expected arrival time $c[i+3]$ starting from $a[i+2]$, and not for instance $c[i+2]$, by the increment I. The actual arrival time $a[i+2]$ of the cell $z[i+2]$ is a regeneration point. Upon the arrival of each cell belonging to the virtual connection to be tested, the GCRA performs the following mathematically expressed updating and decisions:

$$c[i+1] = \begin{cases} a[i] + I, & a[i] > c[i] \text{ conforming, regeneration} \\ c[i] + I, & c[i] \geq a[i] \geq c[i] - L \text{ conforming} \\ c[i], & a[i] < c[i] - L \text{ nonconforming, discr.} \end{cases}$$

$$c[0] = a[0] = 0 \text{ starting condition}$$

The correct function of a GCRA applied to a cell stream could be brought about by specifying a known cell stream and evaluating the arrived at decisions. However, to that end the virtual connection must be available for testing purposes and the result of the GCRA must be directly accessible. The former is not possible during operation (on-line), the latter requires access by an apparatus to the output of the UPC/NPC in which the GCRA is implemented, which cannot be realized without intervening in the test object. If the decisions of an on-line GCRA are to be tested, namely while the GCRA processes an unknown cell stream, a test must be able to switch off this cell stream. Under this premise it is possible to simultaneously investigate the cell stream being processed by the GCRA, and to arrive at the necessary decisions. This takes place according to the invention through a second GCRA of the same kind, which is synchronized with the first. However, as a rule the effect of the first GCRA can only be determined at the output of the network element at the input of which the traffic monitor is located. The invention therefore provides for arriving at the decision of whether the first GCRA operates in conformity by comparing the results, where the second GCRA establishes the limit.

Two particular problems must be observed when testing a first GCRA by means of a second identical GCRA. On the one hand, two different implementations of a GCRA will arrive at different decisions due to different calculation accuracies, presentation of the parameters I and L or similar. On the other there is the so-called phase problem when two GCRAs are compared: if the same cell stream is provided to two identical GCRAs, but they are started at different times, they will as a rule arrive at different decisions.

The first problem can be overcome by an agreement, such as can be derived from the recommendations or the norms: a UPC/NPC with a contract (GCRA*, I*, L*) conforms to (GCRA, I, L) insofar as (GCRA*, I*, L*) considers at least as many cells during an observation period as agreed, like (GCRA, I, L), where I*=I+R and R>0. The tolerance R is very small and must be established. This is a lesser requirement than the coincidence of the decisions.

If a second GCRA is started for cells of a same connection for which a first GCRA is already in operation, equal results are only obtained when the starting condition of the second coincides with the momentary condition of the first, which is practically only feasible for the "leaky bucket" condition. To perform a conformity test of a GCRA through a second GCRA, the latter must be able to be started from a regeneration state, if the former is in a regeneration state. According to a preferred form of the method of the invention, synchronization therefore takes place when both GCRAs are in a regeneration state.

If the above explained mathematical formulation of the GCRA is expressed by the difference $y[k]=c[k]-a[k]$ and the intermediate arrival time $i[k+1]=a[k+1]-a[k]$, instead of by the theoretical arrival time $c[k]$ and the actual arrival time $a[k]$, the result is the following formula for the sequence $\{y[k]\}$ when k>0:

$$y[k+1] = \begin{cases} I - i[k+1], & y[k] < 0 \\ y[k] + I - i[k+1], & 0 \leq y[k] \leq L \\ y[k] - i[k+1], & y[k] > L \end{cases}$$

$$y[0] = 0, i[1] > 0 \text{ starting condition}$$

where $y[k]$ is characterized as a "one-point cell delay variation". 'y' can never become larger than I+L. If a sequence $\{d[n+q]\}$ is started for the cited cell stream at any point in time k=q>0 with an algorithm of the same value, where n>0 with a defined starting value of I+L, the mathematical illustration is as follows:

$$d[n+q+1] = \begin{cases} I - i[n+q+1], & d[n+q] < 0 \\ d[n+q] + I - i[n+q+1], & 0 \leq d[n+q] \leq L \\ d[n+q] - i[n+q+1], & d[n+q] > L \end{cases}$$

$$d[q] = I + L, i[q+1] = 0$$

Since the actual intermediate arrival time $i[q+1]$ is not known at the start, the theoretically impossible value of zero is used, which is decidedly smaller than the actual value. The sequence $\{d[n+q]\}$ with n>0 is a majorant of the sequence $\{y[n+q]\}$ for all q>0. This means that the time $a[n+q]$, at which $d[n+q]<0$, is a regeneration point of the investigated cell stream because $y[n+q]<0$ is also applicable then. The sequence $\{d[n+q]\}$ and thereby its zero passage can be determined, in stark contrast to that of $\{y[n+q]\}$. In this way it is possible to carry out the synchronization during the regeneration state.

Although the sporadic occurrence of regeneration points is probable, it is not compelling; for example a uniform cell stream with the agreed peak cell rate has no regeneration point. Nor is its detection a trivial matter. To be able to start an on-line test at almost any time, and therefore not having to wait for a regeneration point, a further configuration of the method of the invention provides for forcing the regeneration point. GCRAs are implemented in each UPC/NPC for the connections to be controlled. The value pairs I, L are agreed and written to a memory when the connection is established. The contents of this memory are used when a cell of the respective connection arrives. The memory contents are temporarily changed to force the regeneration point, specifically the increment I is replaced by a substitute increment I'. After some time, when the effect of the new increment I' has materialized, the memory contents are overwritten with I. The resulting effect is described further on. However, how the alteration of the increment is brought about should be explained first.

I' is transported to the UPC/NPC by means of a special cell, which is immediately recognized as such and then replaced by I' in memory I. This cell is subsequently destroyed and becomes nonexistent to the GCRA. Since such cells could be misused, they must only be generated by the network operator and destroyed by the first GCRA through which they pass. The realization of the special cell can take place for example by means of a so-called "operation and maintenance" OAM cell; another possibility would be to use a so-called "resource management" RM cell. OAM cells are sporadically inserted into the cell stream by the users and network operators, and therefore represent no additional burden. The OAM cell is sent to the special cell by its coding, which can be for example: to the "function specific field" (or to another suitable place), where the coded value of the increment I' or I and a secret identification code are entered, based on which the cell is destroyed after the increment has been read. Another assurance of the destruction can take place via the "reserved future use" field, by defining a bit for all OAM cells, which is then described by its inverse value for the special cell.

The substitute increment I' is set to the value of $\delta-\epsilon$, where $\delta$ is the transmission time of a cell and $\epsilon>0$ is dependent on the tolerance R. In other words, I' is shorter than the minimum distance required so that the cells can follow each other. The GCRA with the contract (GCRA, I', L) is therefore forced into a regeneration state where it remains. When the next cell from the virtual connection to be tested arrives, the calculation of the sequence {d} is started, where an auxiliary increment I"=$\delta$ is used instead of I. Since I" is smaller than the possible intermediate arrival time, the sequence {d} becomes monotonic. The smaller by $\epsilon$ substitute increment ensures that the actual regeneration state is reached before the one artificially determined by {d}, in spite of the tolerances which must be observed. After the regeneration state has been reached, the substitute increment I' in the first GCRA is reset to the contractual increment I by means of a further OAM cell. The following theoretical arrival time is established with c[m+1]=a[m]+I for the actual arrival time a[m] of the next arriving cell of the tested connection. At the same time the second GCRA is started with c[1]=I. This synchronizes both GCRAs within a useable time period and both deliver the same results within the tolerance framework, as long as both operate correctly. A condition of the correct operation is that the difference in running time is smaller than $\delta$ for signals from the point where the cell stream is split into two branches to the place where each of the cells is processed by the GCRA.

The results from both GCRAs are now compared for the true conformity test. However, in the rarest of cases should some information about the rejected cells be accessible in the UPC/NPC to be tested or in the first GCRA. In most cases the output is not directly accessible at all. For example, only the incoming and outgoing connections of a switching unit are available as a rule. The preferred comparison is therefore by counting the cells belonging to the connection, in accessible places before and after the two GCRAs, and comparing the positions of the counters. With the second GCRA it is assumed that at least the conforming cells can be directly obtained at the output. In this sense the true conformity test can take place for example as follows: During a selectable observation period, the arriving cells belonging to the connection are continuously counted. The result is a counter position A(t). Conforming cells from this connection according to the first GCRA are also continuously counted at the next possible place, which results in a counter position C(t). The difference D(t)=A(t)−C(t) is the total number of cells that have gone under either due to discrimination by the first GCRA or for other reasons. It is an advantage to effectively count only this difference to avoid large counter positions. In addition, the nonconforming cells of the investigated connection according to the second GCRA are continuously counted, or they are calculated from the difference between the first counting and a counting of conforming cells according to the second GCRA, which results in a counter position B(t). In the ideal case the counter positions coincide with B(t)=D(t)=A(t)−C(t). From the user's point of view the conformity is also provided when B(t) is greater than A(t)−C(t); however, this is an indication for the network operator that the first GCRA certainly discriminates less strongly than the second. If B(t) is conversely smaller than A(t)−C(t), the conformity can still be provided. The difference could be due to an additional cell loss between the two acquisition places for A(t) and C(t), for example in the matrix switch of the switching unit.

Although the described process allows to estimate, it does not provide for more precise information. This can be helped by an additional step of the method and by using a further OAM cell. Therefore five different types of usage are defined, the so-called "flows" F1 to F5. An F4 cell is used, which is a cell from the network itself that cannot be accessed by the user. It is inserted into the cell stream immediately after the UPC/NPC, thus within the network element at an otherwise not accessible place; this generator is being discussed for the ITU recommendations. Among other things the OAM cell contains an indication about how many cells of the respective connection were contained in the cell stream since the last OAM cell. If the beginning and the end of an observation period is adjusted for the arrival of F4 cells, and their information about the cell number F(t) is evaluated, it can be determined how many cells were lost after the first GCRA, namely E(t)=F(t)−C(t), where F(t) and thereby E(t) are not originated by continuous counting, but can only be indicated at the end of the observation period. If the number E(t) is also considered, then C(t)+E(t) is the number of cells passed on by the output of the first GCRA, and A(t)−B(t) is the number of cells which the second GCRA lets pass. Therefore, in the ideal case A(t)−B(t)=C(t)+E(t) or D(t)=B(t)+E(t) and any deviations from this equation enable an immediate conclusion of the disparate operation of the two GCRAs. Of course C(t)+E(t) corresponds to the number F(t) of transmitted cells announced by the F4 cell. This means that the determination of C(t) could be omitted due to the comparison alone. But C(t) is useful for determining the number of cells lost after the first GCRA. Either way, at least one counter position applies to the order of magnitude of all cells transported during the observation period.

Figure 2:
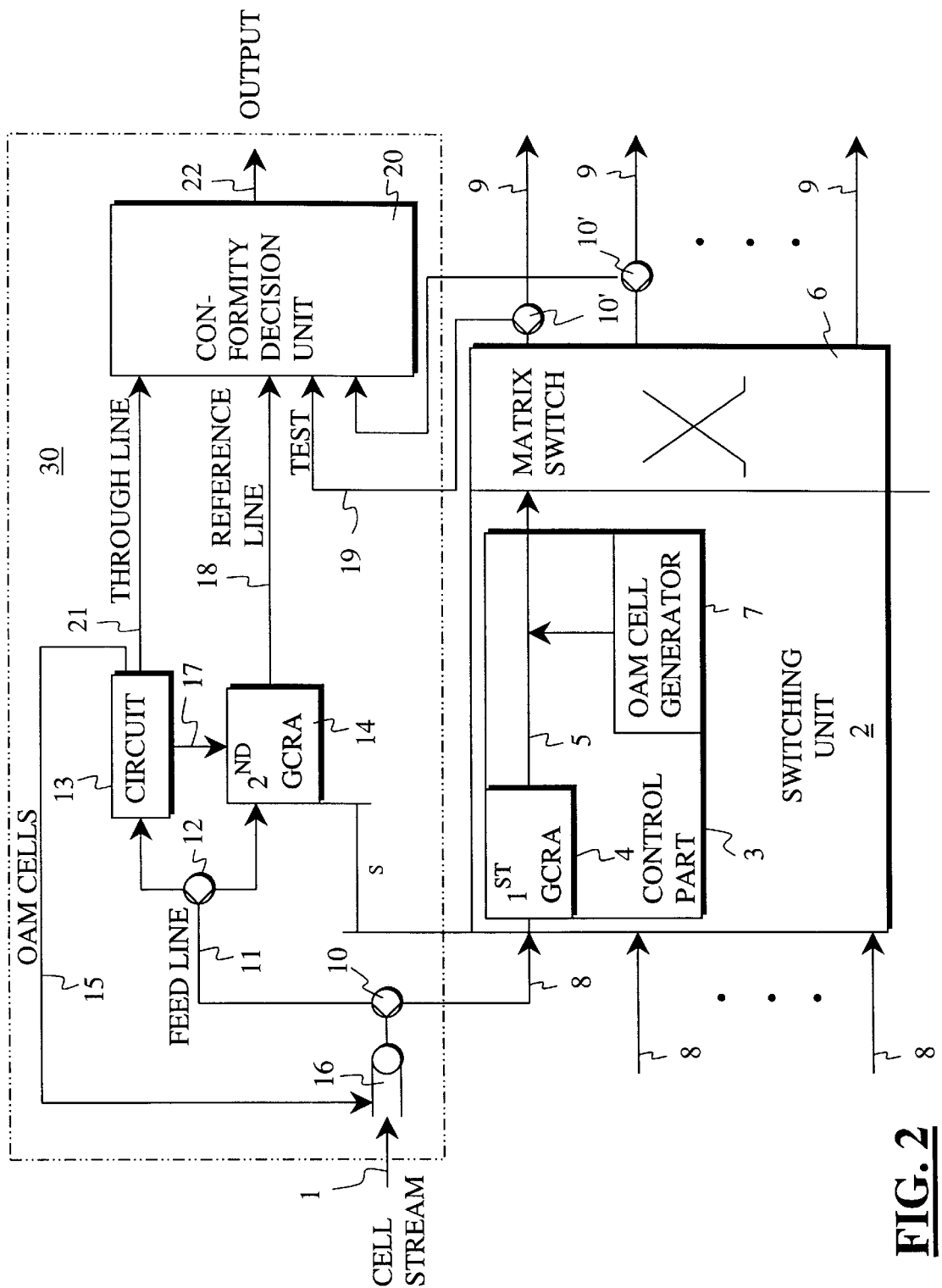
FIG. 2 is the schematic arrangement for testing the conformity of a GCRA.

FIG. 2 schematically illustrates a possible arrangement for the conformity testing of a GCRA in accordance with the previously described method. A line 1 is indicated at the far left, through which a cell stream is directed to a network element with traffic control, thus the figure indicates a switching unit 2 with the control part 3. The significant component of the latter is the UPC/NPC 4 with a connection to the first GCRA which affects the cell stream. The latter reaches the actual matrix switch 6 via the internal line 5. An OAM cell generator 7 is able to gate-lock F4 cells in the cell stream of the internal line 5. The switching unit 2 has a number of inputs 8 and of outputs 9. One branch each 10, 10' is located in the input and the output line through which the connection to be tested runs, allowing the respective cell stream to be directed to further devices. The switching unit 2 could also be constructed so that such test connections are already available.

Except perhaps for the branches 10, 10', the part of the arrangement described so far is usually present and contains the test object, the UPC/NPC 4 with the first GCRA. The apparatus 30 for carrying out the method of the conformity testing of this first GCRA comprises a feed line 11 with a further branch 12 through which the cell stream is supplied to the circuit 13, and to an implementation of the second GCRA 14. The length of the line from the branch 10 to the implementation of the second GCRA 14 differs from that of the branch 10 to the test object by the difference in length s. The difference in running time caused by the difference in length s must essentially be constant and its figure must be smaller than a cell transmission time. Circuit 13 inserts OAM cells (respectively RM cells) into the cell stream via a return line 15 and an insertion element 16.

The insertion element 16 is essentially a delay line by one cell; if an empty cell is present therein and a cell is available for insertion, the former is replaced by the latter. The OAM cells inserted via insertion element 16 cause the change or the resetting of the increment I in the first GCRA. Circuit 13 forms the intermediate arrival times of the cells of the connection to be tested and calculates the sequence {d}. Otherwise the cell stream continues unchanged via a through-line 21 to a conformity decision unit 20. It starts the comparison algorithm at the regeneration point via a command line 17, which leads to the implementation of the second GCRA 14. The cell stream at the output of the second GCRA reaches the conformity decision unit 20 via a reference line 18. The cell stream also reaches the conformity decision unit 20 via a test line 19 from the branch 10' at one of the outputs 9 of the network element 2. Unit 20 sets and starts a counter for each of the cells arriving via the three lines, or for their difference, and performs comparison operations. The decision can be obtained at the decision unit's output 22. The professional can configure such a conformity decision unit 20 in detail, including the sequence control, without any further information.

Insofar as the cell stream can be obtained immediately after passing through the implementation of the GCRA to be tested, namely if a branch 10' is present in the internal line 5 (not illustrated), the difference of the GCRA results would emerge directly from the just mentioned comparison operation. This is not the case with a network element such as the drawn switching unit 2. For that reason, in an expanded variation of the apparatus, the conformity decision unit also includes an evaluation of the F4 cells. The arrival time of the F4cells is decisive for the observation period. From the content of the F4 cells, the conformity decision unit obtains the number of cells transmitted in the meantime and considers them as a further counter position for its decision.

FIG. 2 illustrates the connection of the apparatus 30 to a single line 1 and to two of the outputs 9. All the connections which each of the input and one of the output lines have in common can be tested with this apparatus. If all the output lines 9 lead to the conformity decision unit 20, any type of physical input connection can be tested. In that way different contracts (GCRA, I, L), each with other values for I and L, can be simultaneously tested for the different virtual connections. It is of course possible to provide the apparatus 30 with several connections for the lines of the network element 2 on the input and the output side, which would allow testing more than one physical input with different GCRAs at the same time.

The method and the apparatus can be used for tests with the network element both in operation ("in-service test") or independently of the operation ("out-of-service test", e.g. for manufacture, installation or repairs).

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

We claim:

1. A method of testing for conformity of an algorithm called generic cell rate monitoring algorithm (GCRA) in discriminating data cells of a virtual connection which do not correspond to agreed-upon parameters on the time of arrival of such data cells, wherein a cell stream is simultaneously applied to a first GCRA and a second GCRA of the same kind, that the two GCRAs are synchronized, and that the GCRA conformity test is made by comparing the results of the two GCRAs after the time of synchronization.

2. A method as claimed in claim 1, characterized in that synchronization is produced at a time when both GCRAs are in a regeneration state.

3. A method as claimed in claim 2, characterized in that in the GCRA to be tested, an agreed parameter is temporarily changed in such a way that after a limited time, a regeneration state of the GCRA is reached and subsequently maintained, and that the parameter is reset at the time of synchronization.

4. A method as claimed in claim 2, characterized in that for a sequence {y} of first-order time-of-arrival differences representing the GCRA, a majorant sequence {d} started with extremal initial conditions is formed, and that the attainment of a regeneration state is determined with the aid of said majorant sequence.

5. A method as claimed in claim 4, characterized in that the majorant sequence {d} is started at or after the time the agreed parameter of the GCRA to be tested is changed, that the changed par is reset upon attainment of the regeneration state, which is indicated by the majorant sequence {d}, and that the second GCRA is simultaneously started with the same parameters as those of the GCRA to be tested.

6. A method as claimed in claim 5, characterized in that one parameter for forming the majorant sequence {d} slightly differs from the corresponding parameter in the GCRA to be tested, so that the majorant sequence {d} reaches the regeneration state correspondingly later.

7. A method as claimed in claim 4, characterized in that one parameter for forming the majorant sequence {d} slightly differs from the corresponding parameter in the GCRA to be tested, so that the majorant sequence {d} reaches the regeneration state correspondingly later.

8. A method as claimed in claim 1, characterized in that during an observation period after synchronization, the number of received data cells belonging to the virtual connection, the number of data cells present after the first GCRA, and the number of data cells discarded by the second GCRA are counted, that the number of received data cells less the number of data cells discarded by the second GCRA is compared with the number of data cells present after the first GCRA, and that the result of the comparison provides an indication of conformity or nonconformity.

9. A method as claimed in claim 8, characterized in that directly at an output of the first GCRA, OAM cells of type F4 are inserted, that the observation period is determined by the time of their occurrence, and that the information on the number of data cells transmitted between two F4 cells is taken from the F4 cells and is substituted for the number of data cells present after the first GCRA.

10. Apparatus comprising a controller (3) containing an implementation of a first generic cell rate monitoring algorithm (GCRA), an insertion circuit (16) followed by a branching element (10) in a line (1) for a cell stream at an input (8) of the network element (2), an implementation of a second GCRA (14) for testing the first GCRA and an adjacent circuit (13) for synchronizing the GCRAs which are connected to the branching element (10) in such a way that a delay difference between cells travelling from the branching element (10) to the two implementations of the GCRA (3, 14) is less than one cell transmission time, by a return line (15) from the circuit (13) to the insertion circuit (16), and by a GCRA conformity decision unit (20) connected to the circuit (13), to the implementation of the second CCRA (14), and to at least one output (9) of the network element (2).

11. Apparatus as claimed in claim 10, characterized in that the conformity decision unit (20) comprises an evaluating circuit for F4 cells and a comparison filter which determines the cells lost between the insertion point of the F4 cells in the network element (2) and the conformity decision unit (20) since the arrival of the last F4 cell.

* * * * *

UNITED STATES PATENT AND TRADEMARK OFFICE
CERTIFICATE OF CORRECTION

PATENT NO : 5,991,274
DATED : November 23, 1999
INVENTOR(S): Grunenfelder et al

It is certified that error appears in the above-identified patent and that said Letters Patent is hereby corrected as shown below:

At col. 10, line 11, please cancel "par" and substitute --parameter-- therefor; and at line 54, please cancel "CCRA" and substitute --GCRA-- therefor.

Signed and Sealed this

Twentieth Day of June, 2000

Q. TODD DICKINSON

*Attest:*

*Attesting Officer*     *Director of Patents and Trademarks*